April 5, 1960 W. C. DALLMAN 2,931,264
THREADED NUT ADAPTED TO BE LATERALLY APPLIED TO BOLT AND
SUBSEQUENTLY CONSTRICTED TO ENGAGEMENT WITH BOLT THREADS
Filed Feb. 10, 1956

INVENTOR.
WILLIAM C. DALLMAN
BY
Walter J. Jason
ATTORNEY

United States Patent Office 2,931,264
Patented Apr. 5, 1960

2,931,264

THREADED NUT ADAPTED TO BE LATERALLY APPLIED TO BOLT AND SUBSEQUENTLY CONSTRICTED TO ENGAGEMENT WITH BOLT THREADS

William C. Dallman, El Cajon, Calif., assignor to General Dynamics Corporation, San Diego, Calif., a corporation of Delaware Application February 10, 1956, Serial No. 564,680

1 Claim. (Cl. 85—33)

The present invention relates generally to slip-on fasteners and more particularly to an improved slip-on nut which may be readily transversely applied upon a threaded element.

In manufacturing operations frequently a situation is encountered where it is necessary to apply a nut upon a threaded element of extended length. To run the nut from an end of the threaded element to a desired position thereupon is time-consuming, and often, by reason of the complexity of the work part, special tools may be required.

An example of a manufacturing operation utilizing extended threaded elements is found in the construction of fixtures and scale models of various parts and assemblies where it becomes necessary to develop irregular shapes and compound curves. To accomplish this, accurate contour templates must be properly spaced apart and secured relative one to another in order to construct a suitable framework on which plaster or the like is then applied and molded into a desired shape. Setting up and spacing of these contour templates is accomplished by inserting long, continuously threaded rods through suitable openings in the templates and thereafter locking the templates in longitudinally spaced relationship with jamb nuts.

Obviously, assemblies requiring the use of a plurality of templates, correspondingly require a plurality of jamb nuts in order to secure each template in desired position on these threaded rods. In the past, the practice has been to thread the nuts on the rods in the usual manner and laboriously screw the nuts into engagement with each face of every template. Obviously this is a time consuming operation and it is to the end of obviating the laborious procedure of running a nut onto an extended threaded element that the present invention is directed.

A primary object of this invention is to provide a slip-on nut of improved construction which is adapted to be positioned on a threaded rod by being fitted transversely about the periphery of the threaded rod and thereafter secured.

Another object of this invention resides in the provision of an improved form of slip-on nut embodying open jaws adapted to receive, and threadedly engage, threads of a threaded rod and to be restrained from lateral displacement from the rod by the clamping of the jaws firmly about the periphery of the threaded rod.

Another object of this invention is to provide a slip-on nut of the character above which is adapted for longitudinal adjustment on the rod after the jaws of the nut have been clamped around the rod.

Another object of this invention is to provide a slip-on squeeze nut embodying internal threads of greater diameter than the mating threads of the rod on which the nut is to be assembled to prevent seizure therewith after clamping.

Another object of this invention is to provide a slip-on squeeze nut that is simple in construction, durable, efficient in use, and economical to manufacture.

Other objects and features of the present invention will be readily apparent to those skilled in the art from the following specification and appended drawings wherein is illustrated a preferred form of the invention, and in which.

Figure 1:
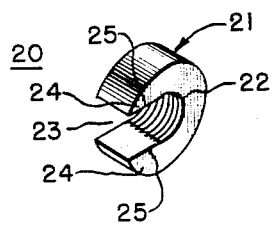
Figure 1 is a perspective view of a slip-on squeeze nut in accordance with the present invention.
Figure 2:
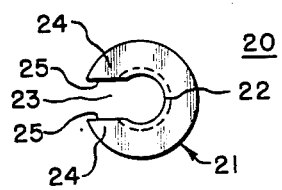
Figure 2 is a front elevational view of the slip-on nut.

Having particular reference now to the drawings, the slip-on squeeze nut 20, as generally illustrated in Figure 1, is substantially cylindrical. Nut 20 is made of a suitable malleable material, such as aluminum alloy metal, or a suitable plastic and comprises an annular body 21 having an axial bore 22 with screw threads therein, and which bore 22 communicates with a tangentially slotted opening 23. Opening 23 extends from bore 22 to the periphery of body 21 and defines opposed jaw members 24 integral with body 21 and having flat, planar interior faces 25. Nut 20 is adapted to be fitted to a threaded rod 26 at the desired position along the length thereof by way of the slotted opening 23, the spacing between the faces of jaw members 24 being sufficient to permit ready fitting. The construction of nut 20 is such that the minor diameter of its threaded bore 22 is greater than the outside diameter of threads 27 on threaded rod 26. This minor diameter of threaded bore 22 is selected such that there will be proper thread clearance without seizure between the threads of the bore and the threads on rod 26 after jaws 24 have been forced, as by clamping about the threads 27 of rod 26. As an example of relative thread sizes, it has been found that a nut 20 having an internal thread of $5/16$ inch diameter, 20 threads per inch, will satisfactorily mate with threads $1/4$ inch diameter, 20 threads per inch on the rod 26 after the jaws 24 of the nut 20 have been moved into enclosing position. It is but a matter of experience to select relative thread sizes to accommodate situations involving varying sizes of rods.

Figure 4:
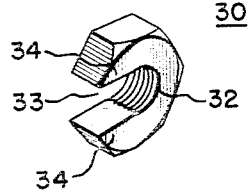
Figure 4 is a perspective view of a slip-on squeeze nut having a slightly modified exterior configuration for use with conventional wrenches.

Referring now to the modification shown in Figure 4, slip-on squeeze nut, indicated generally by the numeral 30, is otherwise identical except for it having a hexagonal configuration. Nut 30 includes a body 31, threaded axial bore 32, tangential slotted opening 33, and jaws 34 which correspond respectively to 21, 22, 23 and 24 of like nomenclature for the nut 20. It is to be here noted that the exterior configuration of a nut of the present invention may be of any desired shape and is not to be limited to those configurations illustrated in Figures 1 and 4. Other suitable shapes may be employed without departing from the spirit of the invention.

Figure 3:
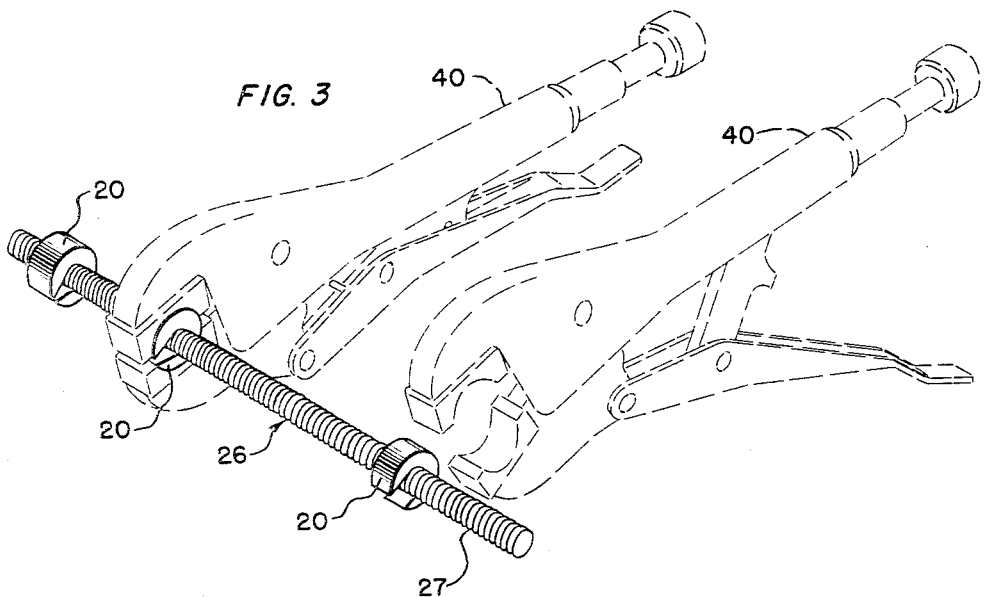
Figure 3 is a reduced scale perspective view showing slip-on squeeze nuts positioned on a threaded rod prior to and after clamping thereto and also showing clamping pliers in dash lines before and after the squeezing or clamping operation.

In the operation of the present device, nut 20 is first positioned on threaded rod 26 by transversely slipping jaws 24 over threaded rod 26 to bring the interior threads of bore 22 of nut 20 loosely into engagement with the threads of rod 26. Jaws 24 are then forced toward one another to clamp nut 20 about threaded rod 26. This operation reduces the size of bore 22 and the diameter of threads 22 of nut 20 whereby there is close correspondence with the size of the threads of rod 26 and without seizure therebetween. The nut may be clamped upon the threaded rod 26 at the position in which it ultimately is to rest or may be clamped in the area of final use and then rotated a relatively few turns to move it to desired position. It is noted that once the nut has been clamped about the threaded rod 26 it cannot be laterally or transversely removed therefrom but yet is adapted for longitudinal movement along the length of the rod. Clamping of nut 20 into substantially encircling relationship with rod 26 is accomplished through the use of a suitable tool such as a pair of conventional vise grip pliers 40 which embodies a modified jaw contour to correspond with nut 20 configuration. It is understood that the vise grip pliers 40 shown in dash outline in Figure 3 are illustrative only of a suitable clamping device which may be employed.

The operation for the modified slip-on squeeze nut 30 is identical to that as described for the nut 20 except that hexagonal configuration adapts nut 30 for use with usual wrenches for longitudinal adjustment on rod 26 after clamping thereon.

While certain preferred embodiments of the invention have been specifically disclosed, it is understood that the invention is not limited thereto as many variations will be readily apparent to those skilled in the art and the invention is to be given its broadest possible interpretation within the terms of the following claim.

What I claim is:

A nut and threaded element combination comprising a threaded element, a nut having an internally threaded bore, said threaded element having an outside thread diameter slightly smaller than the minor diameter of said internal thread of said nut, opposed jaw members defined by a transversely slotted opening communicating with said threaded bore, said opening being greater than the outside thread diameter of said threaded element, said jaws being clamped towards one another to effect thread mating of said nut with said threaded element.

References Cited in the file of this patent

UNITED STATES PATENTS

| | | |
|---|---|---|
| 1,092,256 | Glauber | Apr. 7, 1914 |
| 1,175,440 | Hagen | Mar. 14, 1916 |
| 1,585,874 | Powell | May 25, 1926 |
| 1,676,919 | Persons | July 10, 1928 |
| 2,261,415 | Schnell | Nov. 4, 1941 |
| 2,374,309 | Roxs | Apr. 24, 1945 |
| 2,558,704 | Heimann et al. | June 26, 1951 |